United States Patent [19]
Castleberry

[11] Patent Number: 5,911,345
[45] Date of Patent: Jun. 15, 1999

[54] FILL-THRU LID FOR BEVERAGE CONTAINERS

[75] Inventor: Billy J. Castleberry, Lubbock, Tex.

[73] Assignee: Service Ideas, Inc., Woodbury, Minn.

[21] Appl. No.: 09/016,215

[22] Filed: Jan. 30, 1998

[51] Int. Cl.$^6$ ........................................................ B67D 3/00
[52] U.S. Cl. ............................ 222/482; 222/488; 222/500
[58] Field of Search ................................. 222/481.5, 482, 222/483, 488, 500; 137/38; 220/203.2; 141/331

[56] References Cited

U.S. PATENT DOCUMENTS

| 906,381 | 12/1908 | Carmer et al. | 222/488 |
| 4,310,038 | 1/1982 | Yule | 222/477 |
| 5,653,362 | 8/1997 | Patel | 222/500 |

FOREIGN PATENT DOCUMENTS

| 3106736 | 9/1982 | Germany | 222/500 |

*Primary Examiner*—Philippe Derakshani
*Attorney, Agent, or Firm*—Moore & Hansen

[57] ABSTRACT

The fill-thru lid of the present invention threadedly engages the opening of a thermally insulated beverage server, such as a coffee pot. The opening provides a mouth for filling or emptying a liquid storage area in the beverage server. The upper surface of the lid provides a funnel opening for adding fluids to the storage area of the beverage server. The funnel opening accesses an interior chamber with a floating ball that rises to permit flow into the storage area for the fluid entering the funnel opening. When pouring from the storage area of the beverage server, the floating ball rises to block access to the passage to the funnel opening, forcing the fluid through an alternate passage leading to the integral spout opening. Further, a vent is provided that also accesses the inner chamber of the lid, resulting in the venting of air through the spout opening when fluids are being added to the storage area through the funnel opening.

13 Claims, 5 Drawing Sheets

FILL-THRU LID FOR BEVERAGE CONTAINERS

BACKGROUND OF THE INVENTION

1. Technical Field

The present invention relates generally to lids for portable insulated serving containers, and in particular to lids for such containers that permit filling the container through the lid while in place on the container, and then pouring the contents out of the container through the same lid.

2. Background Information

In the food service industry it has long been desirable to use a single cover or lid to keep the contents, such as coffee, of portable insulated beverage containers hot during both filling of the container and pouring of the contents from the container. Such a lid has proven difficult to develop because of the complexity of the demands on this component. First, it is important that the lid form a tight seal with the neck of the container to insure maximum insulation properties. At the same time, the lid must be vented to permit the escape of displaced air during introduction of fluids into the storage area of the insulated beverage container. Finally, the pouring spout is generally integral with the lid to ensure that the system functions correctly. However, it then becomes essential that no fluids escape through the filling aperture when the contents of the container are being poured out of the spout. Otherwise, spills or poor control of the pouring operation may result. It is also preferable to provide such a lid that automatically performs all of these operations, without the need for manipulation of the position of the lid or any other settings thereon by the person pouring the contents from the container.

Several attempts have been made by others to develop a lid having at least some of these desirable properties. For example, U.S. Pat. No. 4,482,083, issued to Beck on Nov. 13, 1984, discloses a lid that must be moved between a first position, for filling a beverage container, and a second position, for pouring from the same container. U.S. Pat. No. 5,480,054, issued to Midden on Jan. 2, 1996, discloses a highly complex lid that permits filling a container and prevents spilling, but does not include means for pouring fluid therethrough. Another example of a prior approach to this need is disclosed in U.S. Pat. No. 5,038,959, issued to Patel on Aug. 31, 1991. However, there is again no means disclosed for pouring fluids through the lid of the container. Additionally, venting is provided along the threads of the lid, requiring proper and careful attachment of the lid to the container.

The fill-thru lid of the present invention overcomes difficulties described above and affords other features and advantages heretofore not available.

SUMMARY OF THE INVENTION

The fill-thru lid of the present invention threadedly engages the opening of a thermally insulated beverage server, such as a coffee pitcher. The opening provides a mouth for filling or emptying a liquid storage area in the beverage server. The upper surface of the lid provides a funnel opening for adding fluids to the storage area of the beverage server. The funnel opening accesses an interior chamber with a floating ball that rises to permit flow into the storage area for the fluid entering the funnel opening. When pouring from the storage area of the beverage server, the floating ball rises to block access to the passage to the funnel opening, forcing the fluid through an alternate passage leading to the integral spout opening. Further, a vent is provided that also accesses the inner chamber of the lid, resulting in the venting of air through the spout opening when fluids are being added to the storage area through the funnel opening.

It is an object of the present invention to provide a lid for a portable, insulated beverage server that permits filling of the beverage server and pouring of the contents of the beverage server through the lid without manipulation of the position of the lid.

It is another object of the present invention to provide such a lid that provides venting of the displaced air in the beverage server while the beverage server is being filled.

It is yet another object of the present invention to provide such a lid that maintains a tight, insulative relationship with the opening in the beverage server to avoid compromising the insulative properties of the beverage server.

It is yet another object of the present invention to prevent spilling through the filling aperture while fluids are being poured from the spout.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
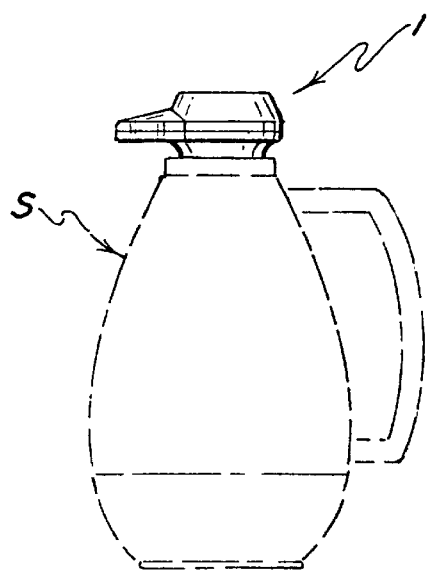
FIG. 1 is a side elevation of a fill-thru lid in accordance with the present invention with the lid shown as it would appear attached to a beverage server, which is shown in phantom outline.
Figure 2:
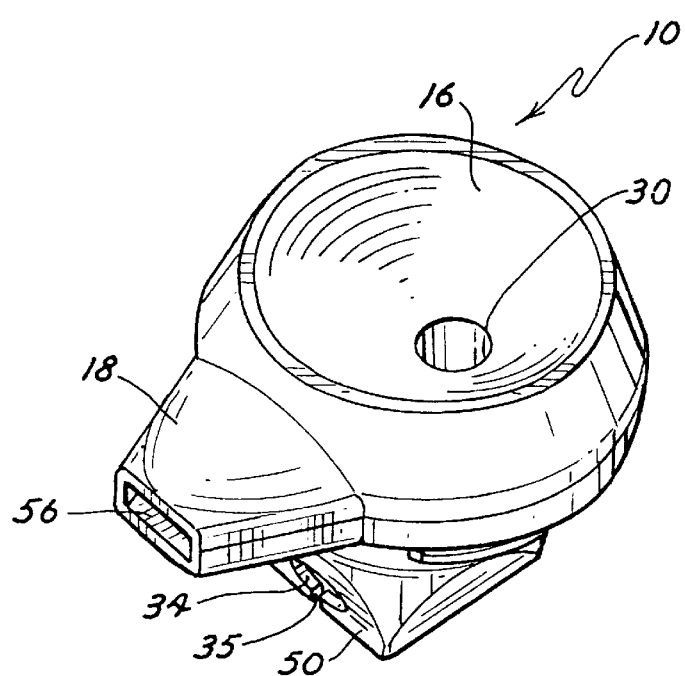
FIG. 2 is a perspective view of the fill-thru lid.
Figure 3:
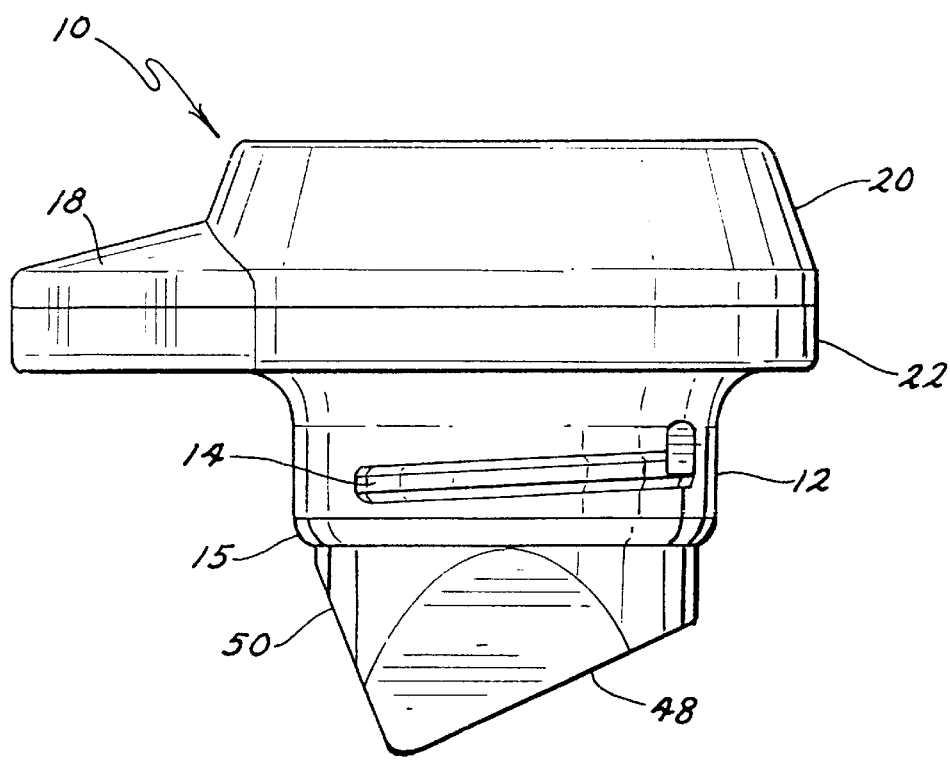
FIG. 3 is a side elevation of the fill-thru lid shown in FIG. 2.
Figure 5:
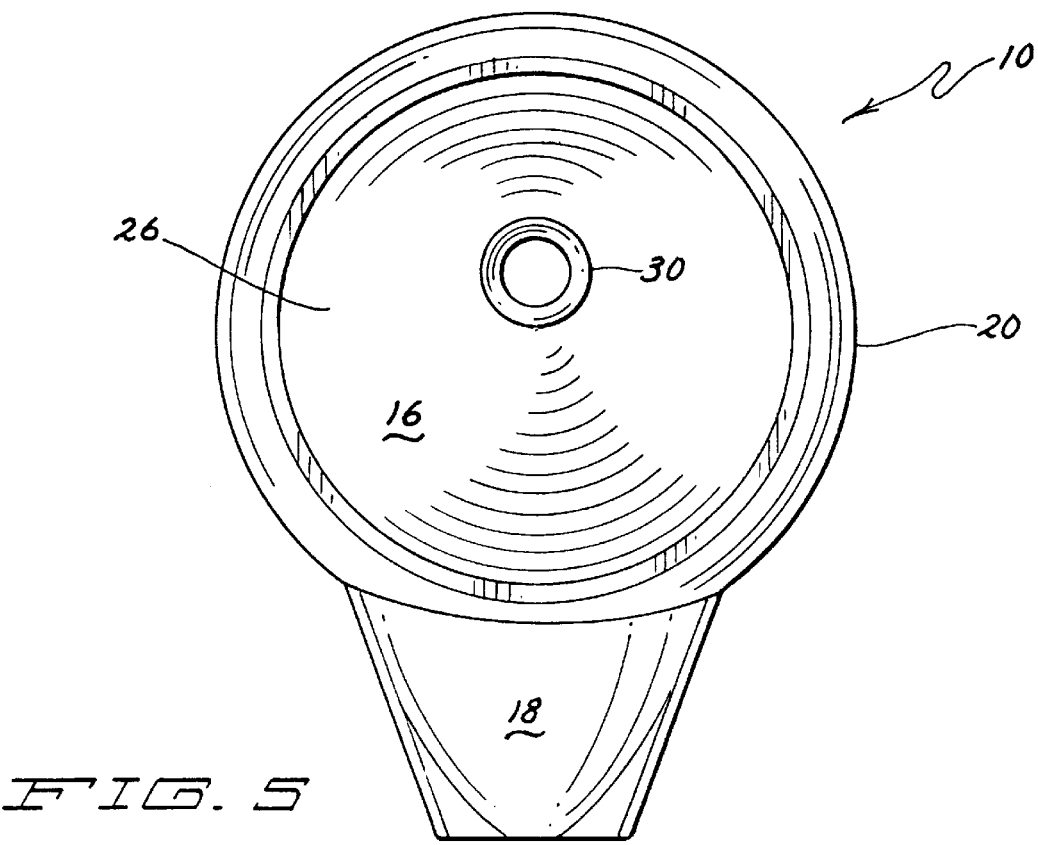
FIG. 5 is a top elevation of the fill-thru lid shown in FIG. 2.

With reference to the drawings, and in particular to FIG. 1, the fill-thru lid for beverage containers is generally indicated by reference numeral 10. It is intended that fill-thru lid 10 will be used in conjunction with an insulated beverage server, such as server S shown in FIG. 1. Server S includes a threaded mouth providing access to an interior storage chamber for the storage of fluids such as coffee. Fill-thru lid 10 includes a neck 12 with threads 14 for engaging the threaded mouth of server S. Fill-thru lid 10 includes a funnel portion 16 for adding liquid to the storage chamber of server S, and a pouring spout 18 for pouring fluids from the storage chamber of server S. Preferably, as shown in FIG. 3, fill-thru lid 10 includes a rubber washer 15 around the periphery of neck 12 to provide a leak-proof seal when attached to the opening of insulated beverage server S.

Figure 7:
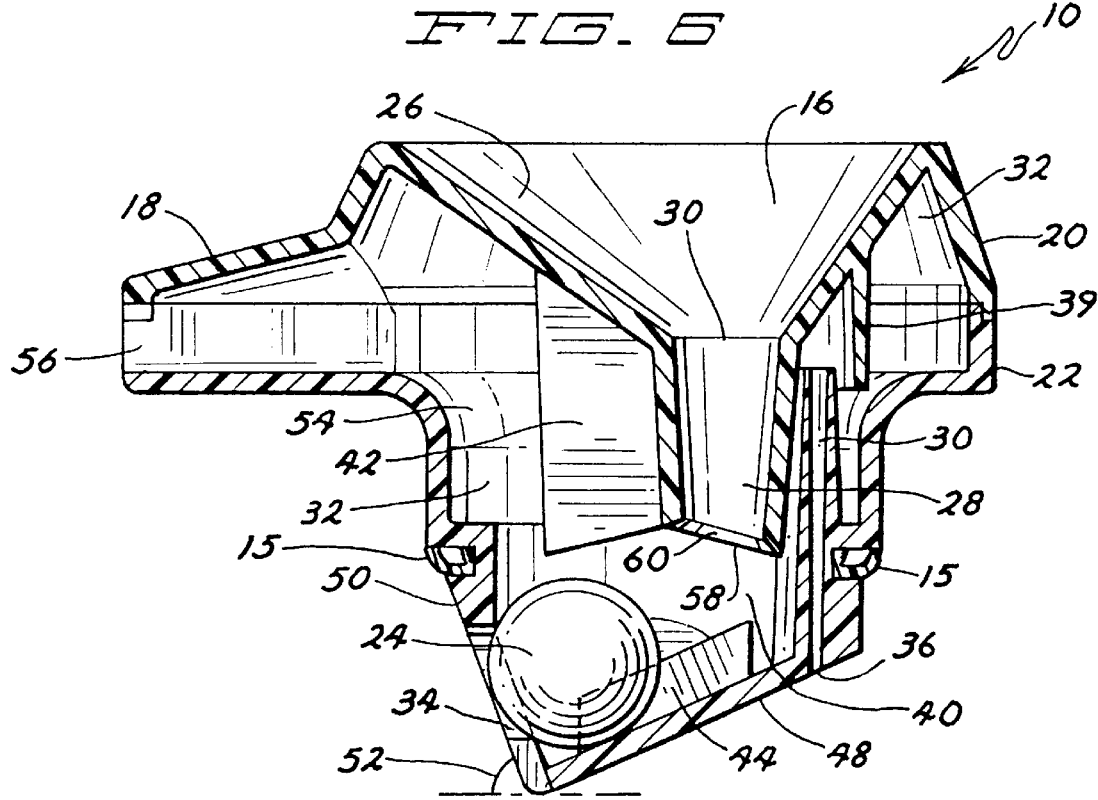
FIG. 7 is a side section view of the fill-thru lid shown in FIG. 2 taken along line 7—7 of FIG. 4.
Figure 8:
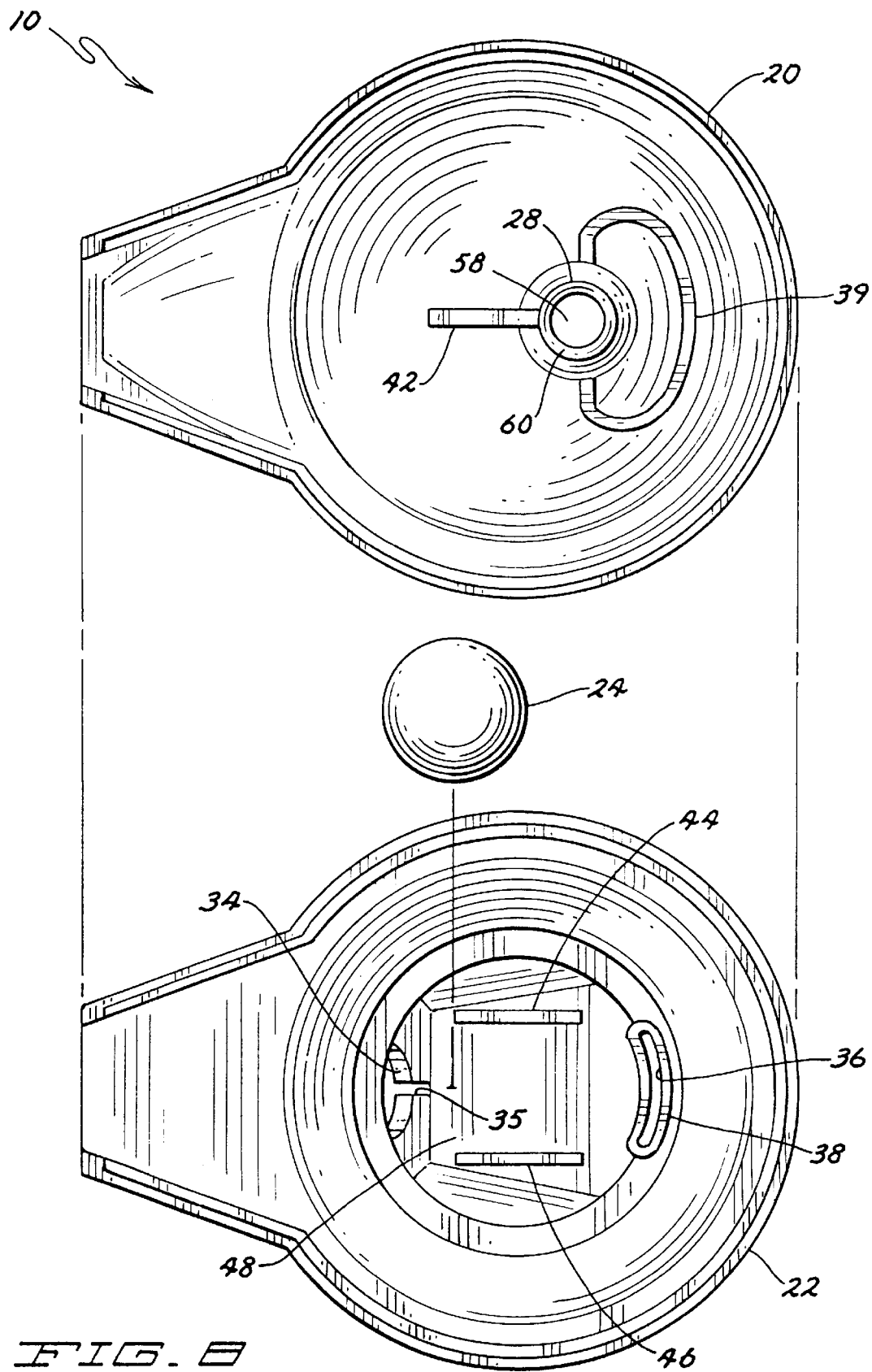
FIG. 8 is an exploded view showing the inner sides of the top and bottom portions of the fill-thru lid shown in FIG. 2.

Preferably, fill-thru lid 10 includes a housing having an upper body portion 20 and a lower body portion 22, as shown in FIG. 8. Fill-thru lid 10 also includes a float ball 24. As seen in FIGS. 7 and 8, the funnel opening of upper body portion 20 includes a funnel surface 26 emptying into funnel channel 28 through funnel fill port 30. Fluids poured into funnel portion 16 of fill-thru lid 10 encounter funnel surface 26, pass through funnel fill port 30 and funnel channel 28.

Figure 4:
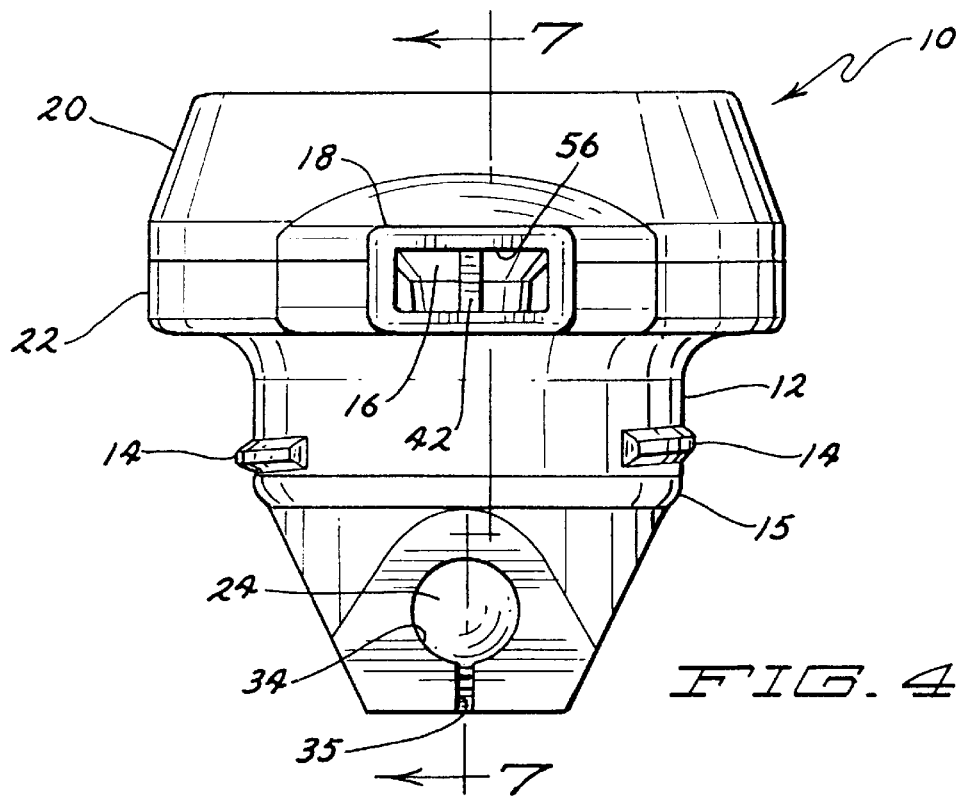
FIG. 4 is a front elevation of the fill-thru lid shown in FIG. 2.
Figure 6:
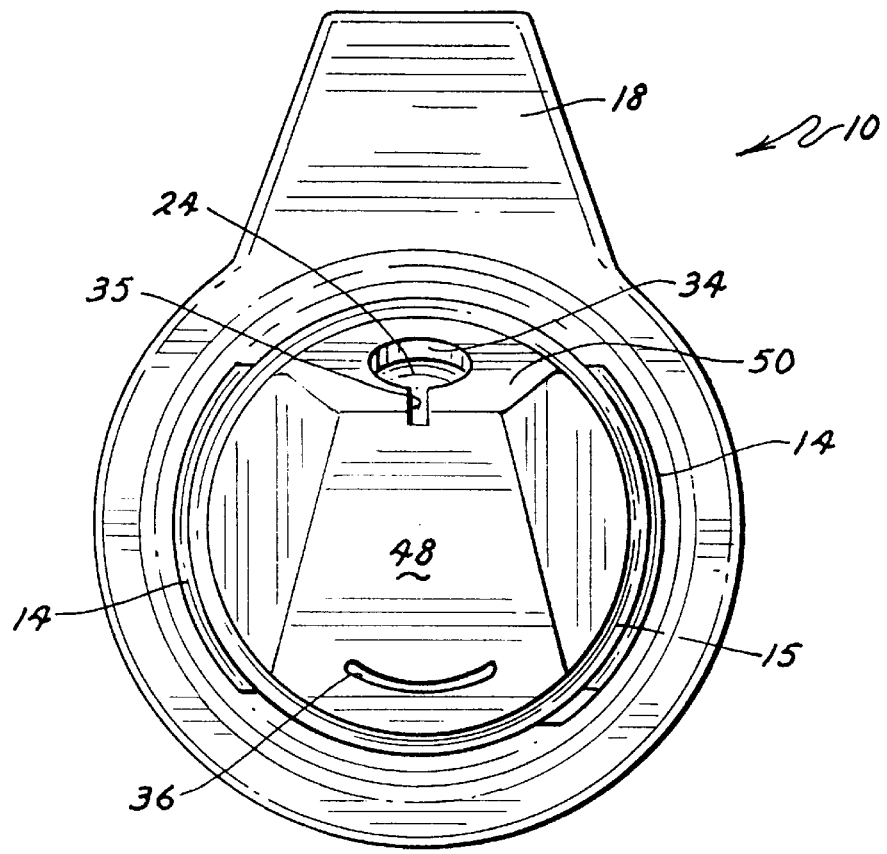
FIG. 6 is a bottom elevation of the fill-thru lid shown in FIG. 2.

Upper body portion 20 and lower body portion 22 are preferably permanently bonded together, forming an internal chamber 32. Internal chamber 32 permits ingress and egress of fluid flow therethrough from and between funnel portion 16, pouring spout 18, storage chamber fill port 34, and vent port 36. Fill port 34 has adjacent thereto a notch 35, as shown in FIG. 4. Vent port 36 provides fluid communication from the storage area of beverage server S to internal chamber 32 via air passage duct 38. Preferably, a skirt 39, projecting downwardly from funnel surface 26 of upper body portion 20, overlies air passage duct 38. Preferably, duct 38 extends high enough above the lower edge of skirt 39 that the mean fluid level during filling is below the top of air passage duct 38. Air is thereby allowed to flow out of beverage server S and over the top of and across the fluid in internal chamber 32 draining down into server S and out fill port 34. Furthermore, when beverage server S is filled, skirt 39 forms a temperature barrier, whereby steam rising through duct 38 from vent port 36 is retained under skirt 39, providing an additional thermal barrier to further reduce cooling of the liquid stored in beverage server S.

Referring to FIG. 7, as float ball 24 travels through fill channel 40, which is in fluid communication with funnel channel 28, it is partially guided by the lower edge of guide vane 42. Preferably, float ball 24 also travels along first and second lower guide rails 44, 46, respectively. Guide rails 44, 46 project into fill channel 40 of internal chamber 32 from the angled lower wall 48 of lower body portion 22. It is important that lower wall 48 be angled somewhat, as shown in FIG. 7, to ensure the positioning of float ball 24 against fill port 34. It is also important that float ball 24 be constructed of lightweight materials having an appropriate density to enhance its ability to float on the liquids typically contained in beverage server S. In particular, it is preferable that, when floating in liquids such as water or coffee, at least 60% of float ball 24 be above the level of the liquid.

Fill port 34 permits fluid communication, through front wall 50, between internal chamber 32 and the storage area of beverage server S. For successful operation of fill-thru lid 10, it is preferred that the angle 52 between front wall 50 and horizontal as shown in FIG. 7 should be at least 60 degrees, and preferably 75 degrees. This is to help insure that float ball 24 rises out of the way of fill port 34 when liquid is being poured into beverage server S through funnel portion 16, providing a smooth filling operation. Fill port 34, in front wall 50, serves both as the terminus of fill channel 40 and the beginning of pour channel 54, which in turn terminates at spout opening 56. Further, funnel fill port 30 serves as the beginning of funnel channel 28, with funnel drain port 58 emptying into fill channel 40. Preferably, funnel drain port 58 has a beveled edge 60 for proper seating of float ball 24 during pouring, as shown in FIG. 10.

Figure 9:
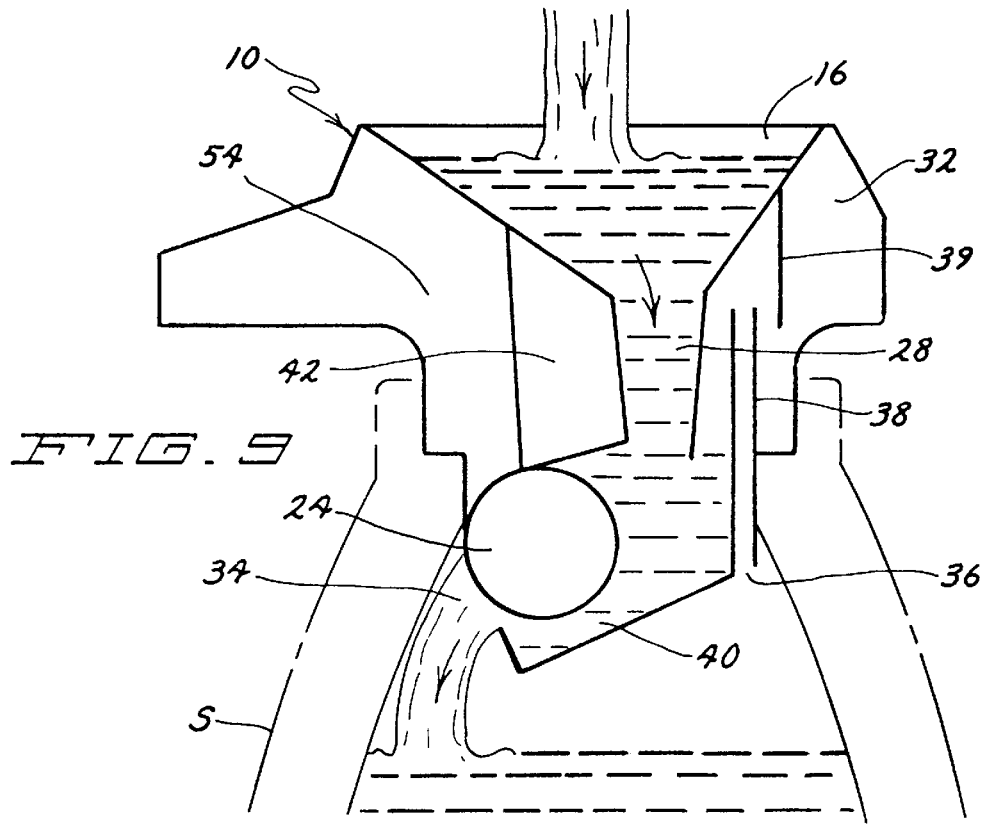
FIG. 9 is a diagrammatic, side sectional view of the fill-thru lid mounted to a beverage dispenser as shown in FIG. 1, showing the function of the invention when the beverage dispenser is being filled with fluid.
Figure 10:
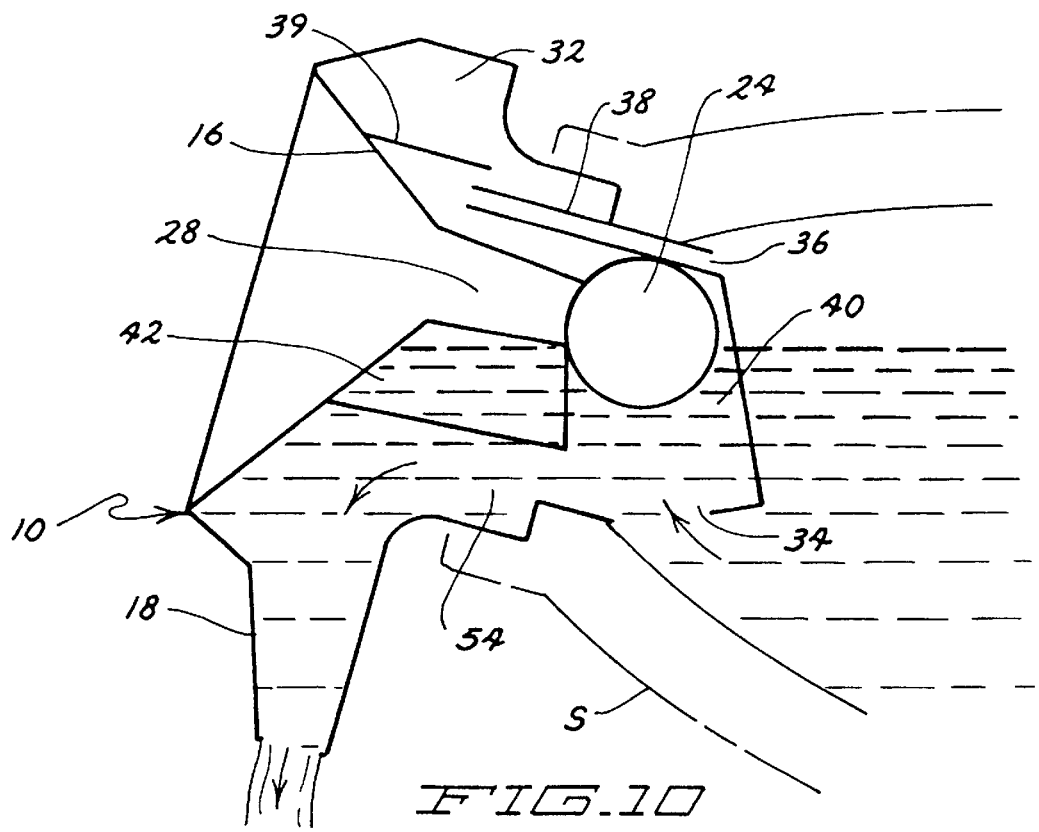
FIG. 10 is a diagrammatic, side sectional view of the fill-thru lid mounted to a beverage dispenser as shown in FIG. 1, showing the function of the invention when liquid is being poured out of the beverage dispenser.

In operation, with reference to FIGS. 9 and 10, when fill-thru lid 10 is being used to fill beverage server S, the liquid flowing into the container is dripped onto funnel portion 16. By acceleration of gravity the liquid flows through funnel fill port 30, into funnel channel 28. The liquid then passes through funnel drain port 58 and enters fill channel 40. As the first volume of liquid enters fill channel 40, float ball 24 tends to block the passage to fill port 34. Initially, liquid tends to gather in fill channel 40 forming a depth therein. As shown in FIG. 9, float ball 24 then floats in the liquid as the fluid accumulates in fill channel 40, allowing the liquid to flow through fill port 34 into the storage chamber of beverage server S. During filling, the depth in fill channel 40 reaches an equilibrium point wherein float ball 24 tends to impede the flow of the liquid through fill port 34. However, that impediment tends to raise the level in fill channel 40 which in turn raises float ball 24 and allows more flow of the liquid through fill port 34. Preferably, the distance between the lower edge of guide vane 42 and lower wall 48 is at least ⅜ inch greater than the diameter of float ball 24. This space allows float ball 24 to rise on top of the fluid being added to server S during filling, as shown in FIG. 9. The flow of liquid from funnel channel 28 prevents float ball 24 from moving away from fill port 34, but the light density of float ball 24, and the dimensions of fill channel 40, permit the liquid to flow smoothly beneath float ball 24.

When filling of beverage server S is complete, the liquid flows from fill channel 40 out through fill port 34 until float ball 24 blocks passage therethrough. The final amount of liquid contained in fill channel 40 may then flow through notch 35. It should be noted that notch 35 is preferably very small, but it is significant in that it permits full drainage of fill channel 40. However, it is preferably kept small to minimize the amount of heat that may escape from the storage area of beverage server S, thus keeping the contents thereof as warm as possible.

As liquid flows in through fill-thru lid 10 to beverage server S it displaces air. That air is vented to and from beverage server S through air passage duct 38. Air flows from the top of air passage duct 38 and through pouring spout 18.

When liquid is being poured from beverage server S, it enters pour channel 54 of internal chamber 32 through fill port 34 and associated notch 35. As in the filling mode, float ball 24 floats on the liquid. As float ball 24 floats away from fill port 34, it is guided by guide vane 42, which directs float ball 24 toward funnel drain port 58. Float ball 24 then seats against beveled edge 60, preventing the liquid from entering funnel channel 28. Rather, the liquid flows through pour channel 54 and leaves spout 18 through spout opening 56.

When pouring liquid from beverage server S, air must enter the server to occupy the volume poured out. During the dispensing operation air enters fill-thru lid 10 through funnel channel 28 and possibly spout 18 in a direction counter to the flow of the liquid. After entering internal chamber 32, the air flows around cover 39 and then into beverage server S through air passage duct 38 and vent port 36.

While the preferred embodiments of the invention have been described, it should be understood that various changes, adaptations and modifications may be made therein without departing from the spirit of the invention and the scope of the appended claims.

What is claimed is:

1. A fill-thru lid for use with a beverage server having an opening providing access to an internal storage area, comprising:

a housing having an internal chamber, said housing having an upper portion and a lower portion;

a funnel-shaped inlet on said upper portion of said housing having a drain port providing fluid access to said internal chamber of said housing;

a fill port on said lower portion of said housing providing fluid access between said internal chamber of said housing and the internal storage area of the beverage server;

a pour spout on one side of said housing in fluid flow communication between said internal chamber of said housing and the exterior of the fill-thru lid;

a flow control member constructed and arranged in said internal chamber to control the direction of fluid flow through said internal chamber of said housing; and means for releasably attaching said housing to the beverage server.

2. The fill-thru lid described in claim 1, wherein:

said flow control member is movable for cooperative seating disposition with said fill port and said drain port during filling through the lid and during pouring liquid out through said pour spout, respectively.

3. The fill-thru lid described in claim 2, wherein:

said flow control member is a float ball movable by liquid into cooperative seating disposition with said fill port and said drain port, respectively, depending upon the direction of fluid flow.

4. The fill-thru lid described in claim 3, wherein:

said internal chamber comprises a fill channel, and said fill port and said drain port are disposed in opposed juxtaposition at opposite end portions of said fill channel.

5. The fill-thru lid described in claim 1, further comprising:

a front wall on said lower portion of said housing, said fill port being positioned on said front wall.

6. The fill-thru lid described in claim 5, wherein:

said front wall is upwardly angled from horizontal at least approximately 60 degrees.

7. The fill-thru lid described in claim 6, wherein:

said front wall is upwardly angled from horizontal approximately 75 degrees.

8. The fill-thru lid described in claim 1, wherein:

said means for releasably attaching said housing to the insulated beverage server comprise a threaded portion on said lower portion cooperating with a threaded portion on the opening of the insulated beverage server.

9. The fill-thru lid described in claim 1, further comprising:

a vent port on said housing providing fluid access between the internal storage area of the beverage server and said internal chamber of said housing.

10. The fill-thru lid described in claim 9, said housing further comprising:

an air passage duct extending from said vent port into said internal chamber, whereby fluids introduced into said internal chamber via said funnel-shaped inlet are prevented from entering the internal storage area of the beverage server via said vent port.

11. The fill-thru lid described in claim 3, said housing further comprising:

an angled lower wall disposed to direct fluid flowing into said internal chamber from said drain port toward said fill port.

12. The fill-thru lid described in claim 11, further comprising:

at least one guide rail projecting from said angled lower wall, said guide rail guiding the movement of said float ball between said fill port and said drain port.

13. The fill-thru lid described in claim 12, further comprising:

a guide vane projecting into said internal chamber from said upper portion of said housing, said guide vane having a lower edge which, in conjunction with said angled lower wall and said at least one guide rail, defines a fill channel between said fill port and said drain port.

* * * * *